(12) United States Patent
Elbaum et al.

(10) Patent No.: US 8,181,034 B2
(45) Date of Patent: May 15, 2012

(54) SECURE DATA UTILIZATION

(75) Inventors: Reuven Elbaum, Haifa (IL); Reuben Sumner, Rechovot (IL)

(73) Assignee: NDS Limited, Staines, Middlesex (GB)

( * ) Notice: Subject to any disclaimer, the term of this patent is extended or adjusted under 35 U.S.C. 154(b) by 106 days.

(21) Appl. No.: 12/450,214

(22) PCT Filed: Jan. 20, 2008

(86) PCT No.: PCT/IB2008/050197
§ 371 (c)(1),
(2), (4) Date: Nov. 23, 2009

(87) PCT Pub. No.: WO2009/090505
PCT Pub. Date: Jul. 23, 2009

(65) Prior Publication Data
US 2010/0082997 A1     Apr. 1, 2010

(51) Int. Cl.
G06F 11/30        (2006.01)
G06F 12/14        (2006.01)
G06F 7/04         (2006.01)
G06F 17/30        (2006.01)
H04L 9/32         (2006.01)
H04N 7/16         (2011.01)

(52) U.S. Cl. ........ 713/187; 713/176; 713/180; 713/193; 726/26

(58) Field of Classification Search .................. None
See application file for complete search history.

(56) References Cited

U.S. PATENT DOCUMENTS 5,745,678 A *   4/1998  Herzberg et al. ............. 726/32
7,103,779 B2    9/2006  Kiehtreiber et al.
7,373,506 B2 *  5/2008  Asano et al. .................. 713/168
7,543,336 B2 *  6/2009  Lampson et al. ............... 726/30
2003/0126454 A1  7/2003  Glew et al.
2003/0188173 A1 10/2003  Zimmer et al.
2003/0196096 A1 10/2003  Sutton
2006/0090084 A1  4/2006  Buer
2007/0198851 A1  8/2007  Goto

OTHER PUBLICATIONS

Microsoft, "Data Origin Authentication," MSDN, Dec. 2005, Accessed Oct. 12, 2011, pp. 3-4, Retrieved [http://msdn.microsoft.com/en-us/library/ff648434(d=printer).aspx].*

"Secure Video Processor IC Manufacturer License Agreement" (May 16, 2007).

* cited by examiner

*Primary Examiner* — Jung Kim
*Assistant Examiner* — Robert Leung
(74) *Attorney, Agent, or Firm* — Husch Blackwell LLP

(57) ABSTRACT

A system, comprising an external memory operative to store data therein, the data including a plurality of sections, each of the sections being associated with a signature, and an internal memory operationally connected to the external memory, and a processor arrangement operationally connected to the internal memory, the processor arrangement including a transfer module to transfer one section from the external to the internal memory, an authentication module to authenticate the signature of the section transferred from the external memory, a validity status module to identify the section as valid if the signature is authentic, and an execution module to utilize the section of the data only if the section is valid, wherein the validity status module is operative to invalidate the section, if the content of the section is changed while stored in the internal memory. Related apparatus and methods are also described.

11 Claims, 6 Drawing Sheets

SECURE DATA UTILIZATION

The present application is a 35 USC §371 application of PCT/IB2008/050197, filed on 20 Jan. 2008 and entitled "Secure Data Utilization", which was published on 23 Jul. 2009 in the English language with International Publication Number WO 2009/090505.

FIELD OF THE INVENTION

The present invention relates to secure data utilization.

BACKGROUND OF THE INVENTION

The following references are believed to represent the state of the art:

US Pat. No. 7,103,779 to Kiehtreiber, at al.;

US Published Patent Application 2003/0188173 of Zimmer, et al.;

US Published Patent Application 2007/0198851 of Goto; and

Secure Video Processor IC Manufacture License Agreement, 16 May 2007.

The disclosures of all references mentioned above and throughout the present specification, as well as the disclosures of all references mentioned in those references, are hereby incorporated herein by reference.

SUMMARY OF THE INVENTION

The present invention seeks to provide improved secure data utilization.

There is thus provided in accordance with a preferred embodiment of the present invention, a system including an external memory operative to store data therein, the data including a plurality of sections, each of the sections being associated with a signature, and an internal memory operationally connected to the external memory, and a processor arrangement operationally connected to the internal memory, wherein the processor arrangement includes a transfer module to transfer one of the sections from the external memory to the internal memory, an authentication module to authenticate the signature of the one section transferred from the external memory, a validity status module to identify the one section as valid if the signature is authentic, and an execution module to utilize the one section of the data only if the one section is valid, wherein the validity status module is operative to invalidate the one section, if the content of the one section is changed while stored in the internal memory.

Further in accordance with a preferred embodiment of the present invention, the system includes an integrated circuit having disposed thereon the internal memory and the processor arrangement, the integrated circuit being operationally connected to the external memory, the external memory not being on the integrated circuit.

Still further in accordance with a preferred embodiment of the present invention the data includes an executable computer program, and the execution module is operative to execute the one section of the executable computer program only if the one section is valid.

There is also provided in accordance with still another preferred embodiment of the present invention a system, including an external memory operative to store data therein, the data including a plurality of sections, at least part of the data being signed with a primary signature, the at least part of the data including at least some of the sections, and an internal memory operationally connected to the external memory, and a processor arrangement operationally connected to the internal memory, the processor arrangement includes a transfer module, an authentication module, and a signature module, wherein during a preliminary procedure the transfer module is operative to transfer the sections from the external memory to the internal memory, the authentication module is operative to authenticate the primary signature, and the signature module is operative to create a symmetric signature for each of the sections based on a first secret, and wherein, prior to utilizing a selected one of the sections of the data the transfer module is operative to transfer the selected section from the external memory to the internal memory, and the authentication module is operative to authenticate the symmetric signature of the selected section using the first secret.

Additionally in accordance with a preferred embodiment of the present invention the transfer module is operative to transfer the at least some sections from the external memory to the internal memory only once during the preliminary procedure, so that while a cached one of the sections is in the internal memory the authentication module is operative to update a value for use in authenticating the primary signature based on the cached section, and the signature module is operative to create the symmetric signature for the cached section, and the authentication module is operative to authenticate the primary signature based on the value which has been updated based the at least some sections.

Moreover in accordance with a preferred embodiment of the present invention the authentication module is operative to calculate a hash based on the content of the cached section, and update the value based on the hash of the cached section.

Further in accordance with a preferred embodiment of the present invention the signature module is operative to encrypt the symmetric signature of the cached section using a second secret, yielding a result.

Still further in accordance with a preferred embodiment of the present invention the signature module is operative to output the result of the encryption for each of the sections to the external memory.

Additionally in accordance with a preferred embodiment of the present invention the signature module is operative to output the second secret to the external memory, only after the primary signature has been positively authenticated by the authentication module.

Moreover in accordance with a preferred embodiment of the present invention, the system includes an integrated circuit having disposed thereon the internal memory and the processor arrangement, the integrated circuit being operationally connected to the external memory, the external memory not being on the integrated circuit.

Further in accordance with a preferred embodiment of the present invention the primary signature is an asymmetric signature.

Still further in accordance with a preferred embodiment of the present invention the asymmetric signature is an RSA signature.

Additionally in accordance with a preferred embodiment of the present invention the data includes an executable computer program.

There is also provided in accordance with still another preferred embodiment of the present invention a method, including transferring a section of data from an external memory to an internal memory, authenticating a signature of the section, identifying the section as valid if the signature is authentic, utilizing the section only if the section is valid, and invalidating the section, if the content of the section is changed while stored in the internal memory.

There is also provided in accordance with still another preferred embodiment of the present invention a method, including performing a preliminary procedure including transferring a plurality of sections of data from an external memory to an internal memory, authenticating a primary signature of the at least part of the data, the at least part of the data including at least some of the sections, and creating a symmetric signature for each of the sections based on a first secret, and performing an authentication procedure for a selected one of the sections of the data, prior to utilizing the selected section, the authentication procedure including transferring the selected section from the external memory to the internal memory, and authenticating the symmetric signature of the selected section using the first secret.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
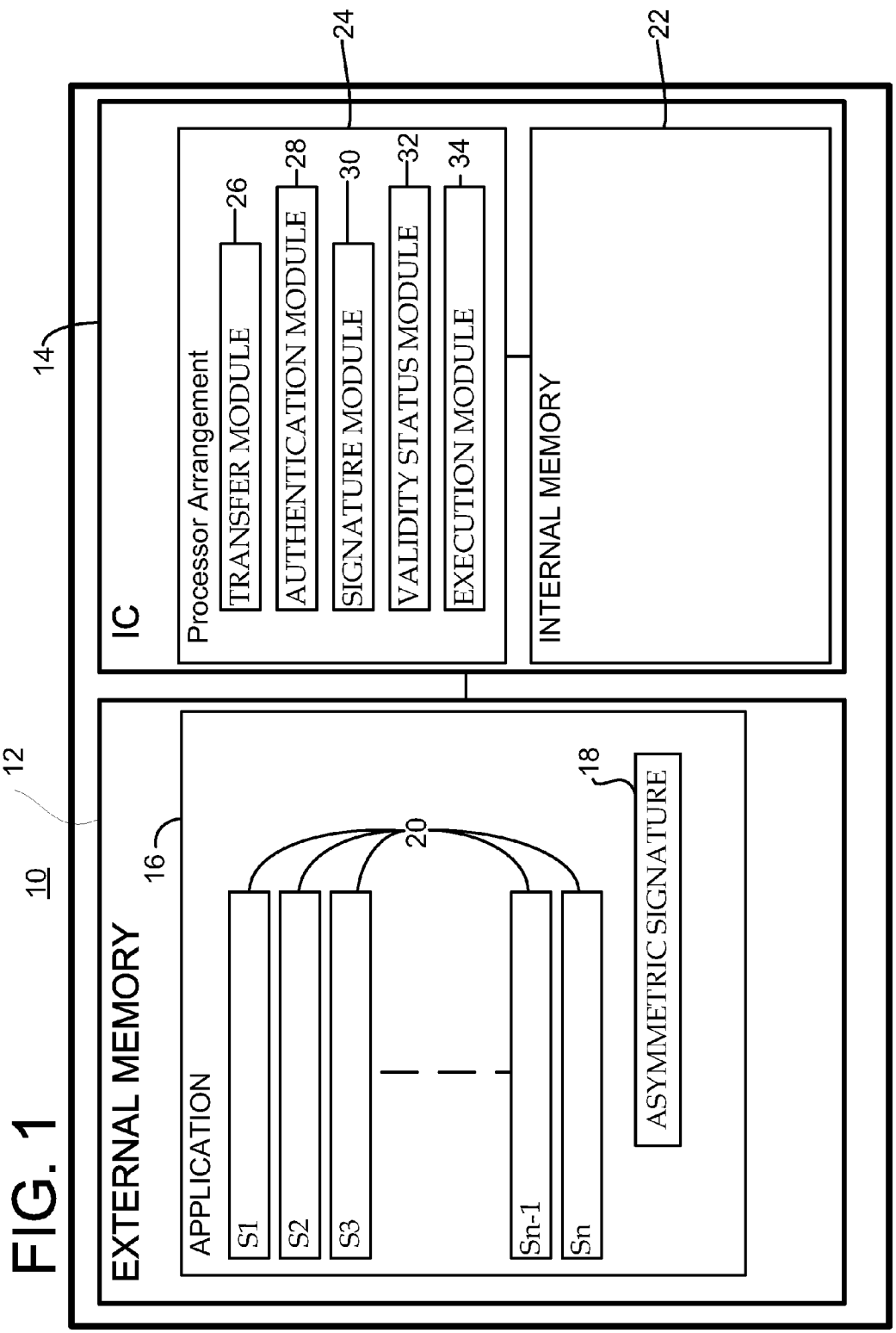
FIG. 1 is a block diagram view of a secure data utilization system constructed and operative in accordance with a preferred embodiment of the present invention.

Reference is now made to FIG. 1, which is a block diagram view of a secure data utilization system 10 constructed and operative in accordance with a preferred embodiment of the present invention.

The system 10 preferably includes an integrated circuit (IC) 14 and an external memory 12.

The external memory 12 is preferably operative to store an application 16 therein.

Persons skilled in the art will appreciate that, throughout the present patent application, the application 16 is used by way of example of data in the form of an executable computer program, and that the present invention is not limited to a particular type of data, but rather includes any suitable data. The term "data", as used in the specification and claims, is defined herein to include an executable computer program.

The application 16 may include an executable computer program and non-executable data.

Persons skilled in the art will appreciate that, throughout the present patent application, execution of the application 16 is used by way of example only, and that the present invention is not limited to a particular type of utilization of data, but rather includes any suitable utilization of data. The term "utilization" as used in the specification and claims, is defined herein to include execution.

The application 16 is typically signed with a primary signature, such as an asymmetric signature 18, typically using an RSA signature algorithm. It will be appreciated by those ordinarily skilled in the art that the application 16 may be signed by any suitable signature method and not just with an asymmetric signature method, for example, the primary signature may be a hash of the application 16, the hash being held by the integrated circuit (IC) 14 for use in authenticating the application 16.

The application 16 typically has a plurality of sections 20. The asymmetric signature 18 is used to authenticate at least part of, and preferably the whole, application 16. Therefore, at least part of the application 16 (typically including at least two of the sections 20), and preferably the whole application 16, is signed by the primary signature.

In accordance with an alternative preferred embodiment of the present invention, the application 16 may be signed by two or more primary signatures. Each primary signature typically signs two or more sections 20 of the application 16. The sections 20 signed by one primary signature may, or may not, overlap the sections 20 of another primary signature(s).

The integrated circuit 14 typically has disposed thereon an internal memory 22 and a processor arrangement 24. The internal memory 22 is preferably operationally connected to the external memory 12 and the processor arrangement 24. The internal memory 22 generally includes a plurality of caches (not shown) for use by the processor arrangement 24 during validation and execution of the application 16.

The processor arrangement 24 may be embodied as a central processor unit (CPU) or the processor arrangement 24 may include a plurality of processing modules with or without an additional CPU. The integrated circuit 14 is preferably operationally connected to the external memory 12. The external memory 12 is not on the integrated circuit 14.

Typically, the internal memory 22, which is located on the integrated circuit 14, is generally accessed via a well defined interface. Therefore, the internal memory 22 is generally more trusted than the external memory 12 which is located off of the integrated circuit 14. Data located externally to the integrated circuit 14 is more likely to be manipulated in a malicious way than data located in the internal memory 22. Therefore, for security reasons it is desirable for the application 16 to be loaded into the internal memory 22 and authenticated and only then run from the internal memory 22.

In accordance with an alternative preferred embodiment of the present invention, the processor arrangement 24 and the internal memory 22 may be implemented in a multi-chip module which includes a plurality of integrated circuits. The processor arrangement 24 and the internal memory 22 may be implemented in the same integrated circuit within the multi-chip module. The external memory 22 may be located on another integrated circuit within the multi-chip module or externally to the multi-chip module.

In accordance with yet another alternative preferred embodiment of the present invention, the processor arrangement 24 and the internal memory 22 may be implemented in a multi-chip module with the processor arrangement 24 and the internal memory 22 being implemented on different integrated circuits within the multi-chip module. The external memory 22 is typically located externally to the multi-chip module. It will be appreciated that if the application 16 is large enough, the whole application 16 cannot generally be loaded into the internal memory 22 at one time. Therefore, one or more of the sections 20 of the application 16 are typically loaded into the internal memory 22 by the processor arrangement 24, as necessary, depending on which of the sections 20 are needed for the execution.

If the application 16 is only authenticated on initialization, or once prior to execution, one or more of the sections 20 located in the external memory 12 may be altered (or otherwise tampered with) prior to, or during, execution of the application 16.

Symmetric signatures are generally small and fast to process, but key handling with symmetric signatures is more difficult. Asymmetric signatures, on the other hand, are typically slower to process and the signatures are larger, but key handling is generally easier. Therefore, the system 10 is generally operative to: authenticate the asymmetric signature 18 of the application 16 during a preliminary procedure, described in more detail with reference to FIGS. 2 and 3; and assign symmetric signatures to each of the sections 20 so that when one of the sections 20 is selected for execution, the symmetric signature of the selected section 20 is validated after loading the selected section from the external memory 12 into the internal memory 22, prior to executing the selected section 20, described in more detail with reference to FIGS. 2, 4 and 5.

The processor arrangement 24 preferably includes a transfer module 26, an authentication module 28, a signature module 30, a validity status module 32 and an execution module 34.

Figure 2:
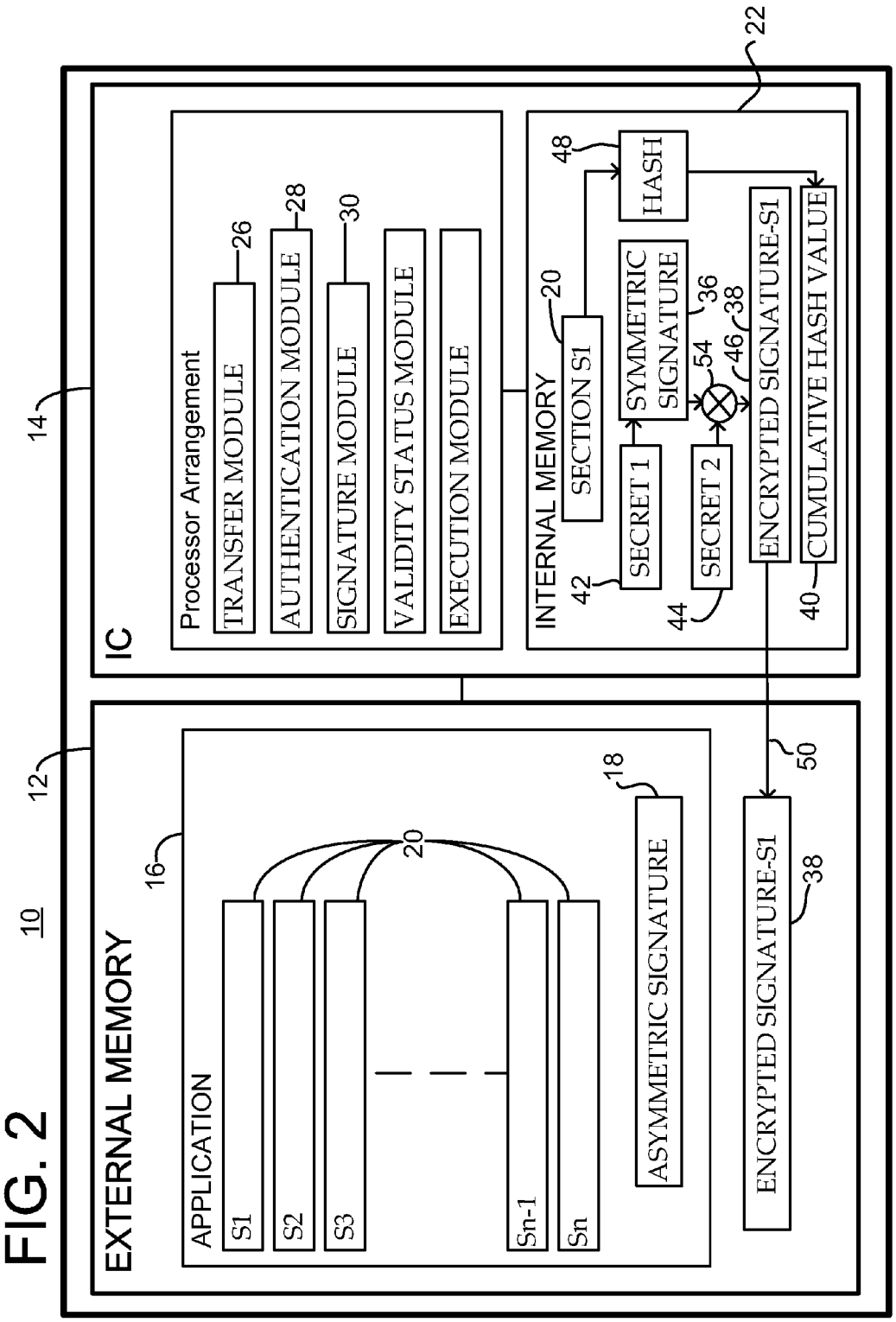
FIG. 2 is a block diagram view of the system of FIG. 1 creating a symmetric signature.

Reference is now made to FIG. 2, which is a block diagram view of the system 10 of FIG. 1 creating a symmetric signature 36.

During the preliminary procedure, each section 20 of the application 16 is preferably transferred only once from the external memory 12 to the internal memory 22 so that while a cached section 20 is in the internal memory 22, the symmetric signature 36 is preferably created for the cached section 20 and then generally encrypted forming an encrypted symmetric signature 38 for the cached section 20 and a cumulative hash value 40 is typically updated for use in authenticating the asymmetric signature 18 based on the cached section 20.

The above steps are now described in more detail below for each cached section.

The transfer module 26 is preferably operative to transfer one of the sections 20 from the external memory 12 to the internal memory 22 during the preliminary procedure. The transferred section 20 is referred to as the cached section 20, as the section 20 is cached in the internal memory 22.

The signature module 30 is preferably operative to create the symmetric signature 36 for the cached section 20 based on a first secret 42. The first secret 42 is preferably either embedded/programmed in the integrated circuit 14 during production of the integrated circuit 14 or the first secret 42 is produced by the signature module 30 using a random or pseudo-random number generator (not shown). The first secret is generally known by the integrated circuit 14 and not the external memory 12. The symmetric signature 36 is at least 1 bit long and typically 32 or more bits long. The first secret 42 is typically at least 20 bits long and preferably more than 100 bits long.

The signature module 30 is preferably operative to perform an exclusive-OR logic gate operation (circle 54) with: the symmetric signature 36 of the cached section 20; and a second secret 44 as input, yielding a result 46. The result 46 is the encrypted symmetric signature 38. The signature module 36 is preferably operative to produce the second secret 44 using a random or pseudo-random number generator (not shown). The second secret 44 is not made "public" until the asymmetric signature 18 has been positively authenticated. The term "positively authenticated", as used in the specification and claims, is defined as "the signature is deemed valid after being checked".

Although, the symmetric signatures 36 are described above as being encrypted using an exclusive-OR operation, it will be appreciated by those ordinarily skilled in the art that the symmetric signatures 36 may be encrypted using the second secret 44 by any suitable scrambling method for example, but not limited to, addition, subtraction, encryption or decryption.

The signature module 30 is preferably operative to output the result 46 of the exclusive-OR logic gate operation for the cached section 20 to the external memory 12 (arrow 50).

The authentication module 28 is preferably operative to: calculate a hash 48 based on the content of the cached section 20; and update the cumulative hash value 40 based on the hash 48 of the cached section 20. The cumulative hash value 40 is used in authenticating the asymmetric signature 18, described in more detail with reference to FIG. 3.

Only copying the sections 20 once during the preliminary procedure to create the symmetric signatures 36 (and the encrypted symmetric signatures 38) and prepare the cumulative hash value 40 for use in authenticating the asymmetric signature 18 not only saves time but also helps prevent a security problem, as follows. If the asymmetric signature 18 is authenticated by first loading all the sections 20, one after the other, and then the symmetric signatures 36 (and the encrypted symmetric signatures 38) are created by loading the sections 20 a second time, the application 16 could be tampered with between authenticating the asymmetric signature 18 and creating the symmetric signatures 36.

As described above, the symmetric signatures 36 are preferably encrypted to form the encrypted symmetric signature 38 in order to prevent use of the symmetric signatures 36 before the asymmetric signature 18 has been positively authenticated. Once the asymmetric signature 18 has been positively authenticated, the second secret 44 is typically outputted to the external memory 12 to enable decrypting the encrypted symmetric signatures 38, described in more detail with reference to FIG. 4.

Additionally, the application 16 may be encrypted in the external memory 12 and/or the internal memory 22 for added security.

Figure 3:
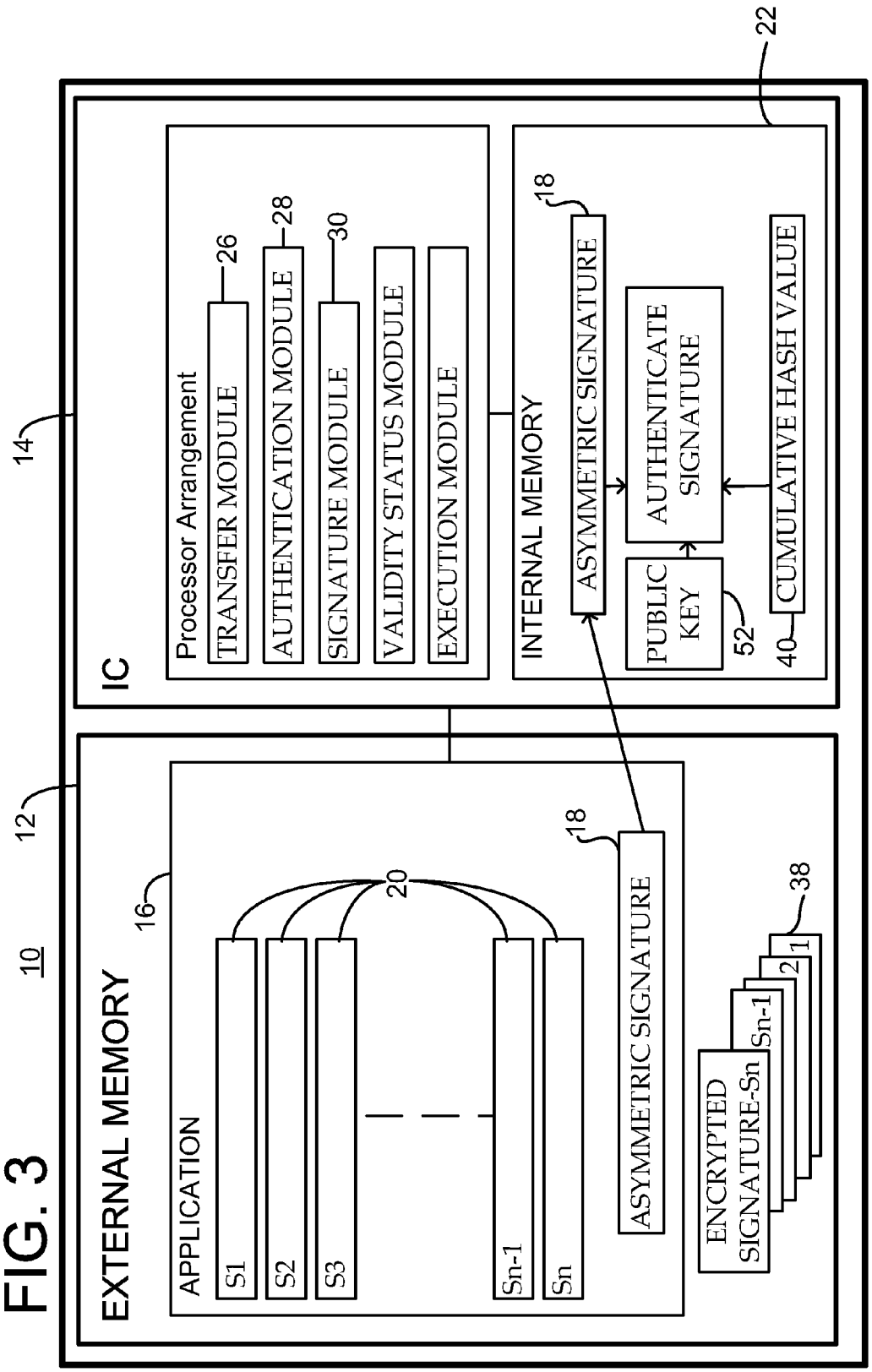
FIG. 3 is a block diagram view of the system of FIG. 1 authenticating an asymmetric signature.

Reference is now made to FIG. 3, which is a block diagram view of the system 10 of FIG. 1 authenticating the asymmetric signature 18.

FIG. 3 shows, the encrypted symmetric signatures 38 for the sections 20 stored in the external memory 12 as the internal memory 22 is generally too small to store all of the encrypted symmetric signatures 38.

During the preliminary procedure, the transfer module 26 generally transfers the asymmetric signature 18 to the internal memory 22. Then, the authentication module 28 is preferably operative to authenticate the asymmetric signature 18 of the application 16 based on a public key 52 and the cumulative hash value 40 which has been updated based on the hash's 40 (FIG. 2) of all the sections 20. The public key 52 may be stored in any suitably secure fashion, for example, but not limited to, in read only memory (ROM) or one-time programmable memory on the integrated circuit 14. By way of example only, in a multi-chip module the public key 52 may be stored on the same integrated circuit as the internal memory 22 (or the IC of the processor arrangement 24, if the internal memory 22 and the processor arrangement 24 are disposed on different ICs) or on another IC.

Alternatively, the public key 52 may come from an unknown non-trusted source. However, in such a case the public key is signed by a private key associated with a public key which is trusted by the system 10. The trusted public key can then be used to verify that the public key 52.

Figure 4:
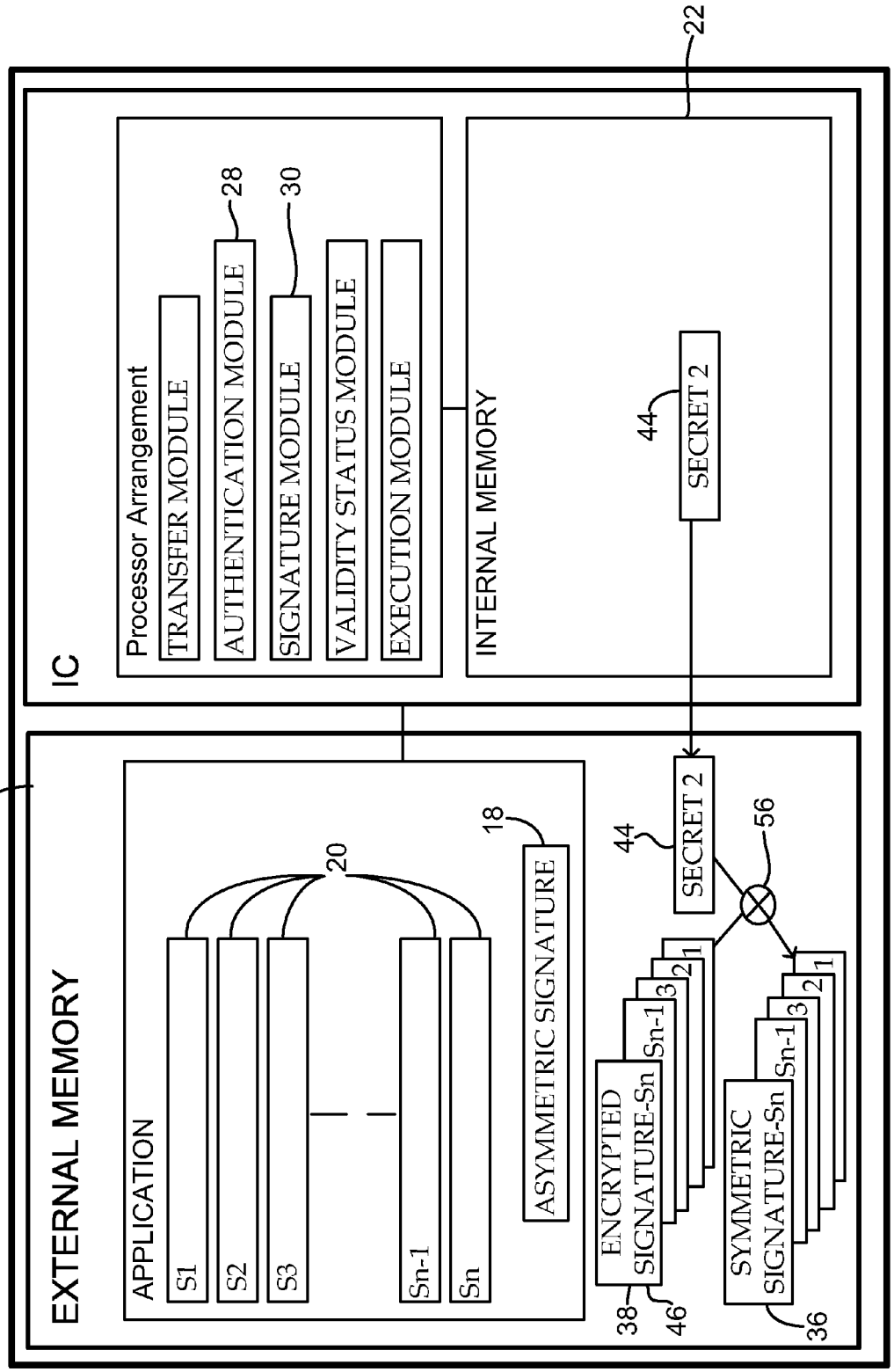
FIG. 4 is a block diagram view showing outputting of a second secret from an internal memory to an external memory of the system of FIG. 1.

Reference is now made to FIG. 4, which is a block diagram view showing outputting the second secret 44 from the internal memory 22 to the external memory 12 of the system 10 of FIG. 1.

The signature module 30 is preferably operative to output the second secret 44 from the internal memory 22 to the external memory 12, only after the asymmetric signature 18 has been positively authenticated by the authentication module 28.

Then, the symmetric signature 36 for each of the sections 20 is typically recovered by decryption using the second secret 44, for example, but not limited to, performing an exclusive-OR logic gate operation (circle 56) with: the result 46 (the encrypted symmetric signature 38) of the exclusive-OR logic gate operation (circle 54 of FIG. 2) for each of the sections 20; and the second secret 44. The XOR logic gate operation (circle 56) is typically performed by the processor arrangement 24 or any other suitable processor.

The resulting recovered symmetric signatures 36 are typically either embedded in the respective section 20 or stored elsewhere in the external memory 12. However, it will be appreciated by those ordinarily skilled in the art that the symmetric signatures 36 may be stored in any suitable location.

Figure 5:
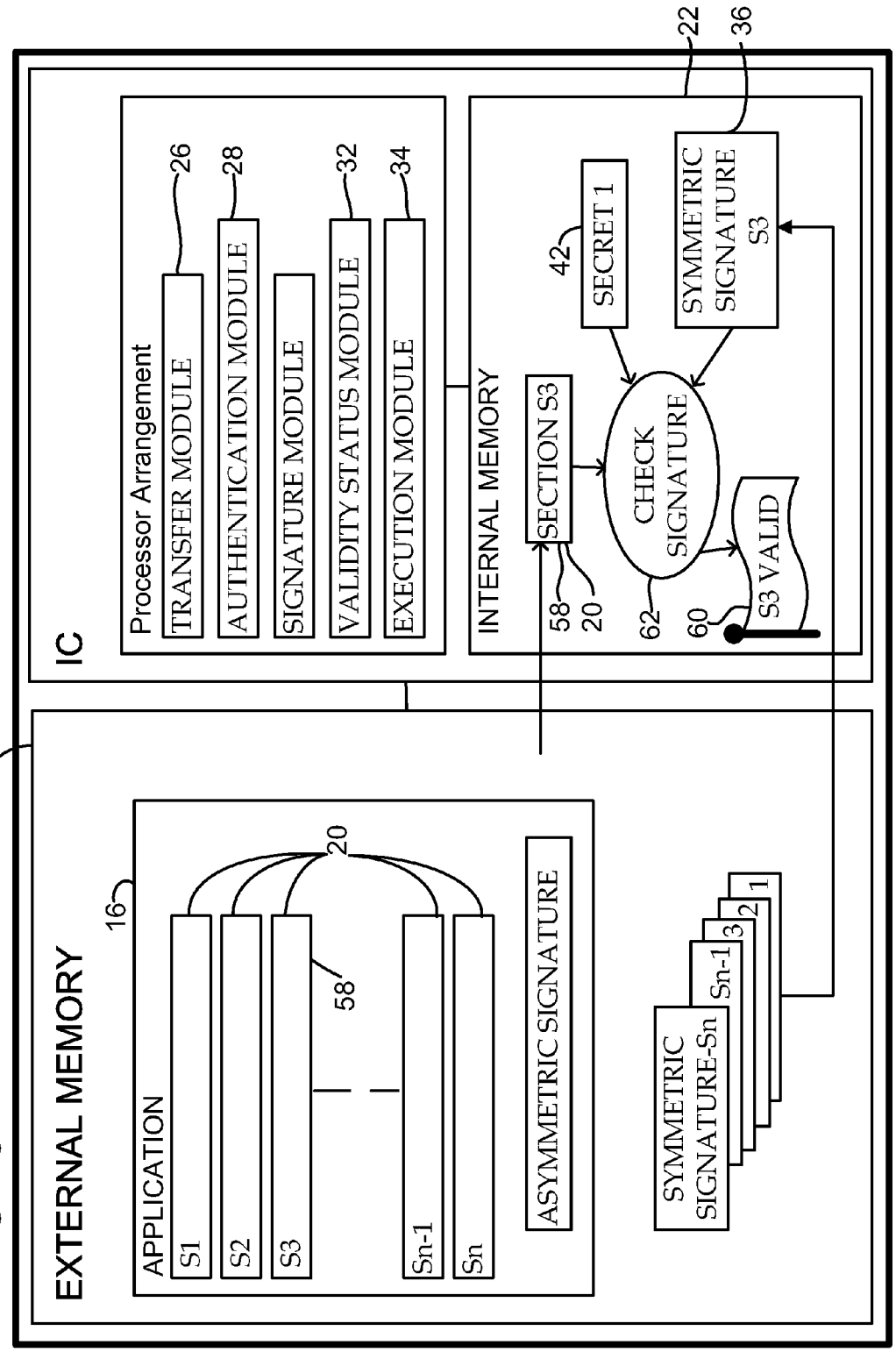
FIG. 5 is a block diagram view of the system of FIG. 1 authenticating a symmetric signature of a section of an application.

Reference is now made to FIG. 5, which is a block diagram view of the system 10 of FIG. 1 authenticating the symmetric signature 36 of one of the sections 20 (section S3 in the example of FIG. 5) of the application 16.

Prior to executing a selected section 58 of the sections 20 of the application 16, the following is preferably performed: the transfer module 26 is operative to transfer the selected section 58 and the symmetric signature 36 of the selected section 58 from the external memory 12 to the internal memory 22; the authentication module 28 is operative to authenticate the symmetric signature 36 of the selected section 58 using the first secret 42 (oval 62); and the validity status module 32 is generally operative to identify the selected section 58 as valid if the symmetric signature 36 is authentic, typically by using a flag 60.

The execution module 34 is preferably operative to execute/utilize the selected section 58 of the application 16 cached in the internal memory 22 only if the section 58 is valid. Similarly, any other sections 20 of the application 16 cached in the internal memory 22 will only generally be executed/utilized if the relevant section 20 is valid.

Figure 6:
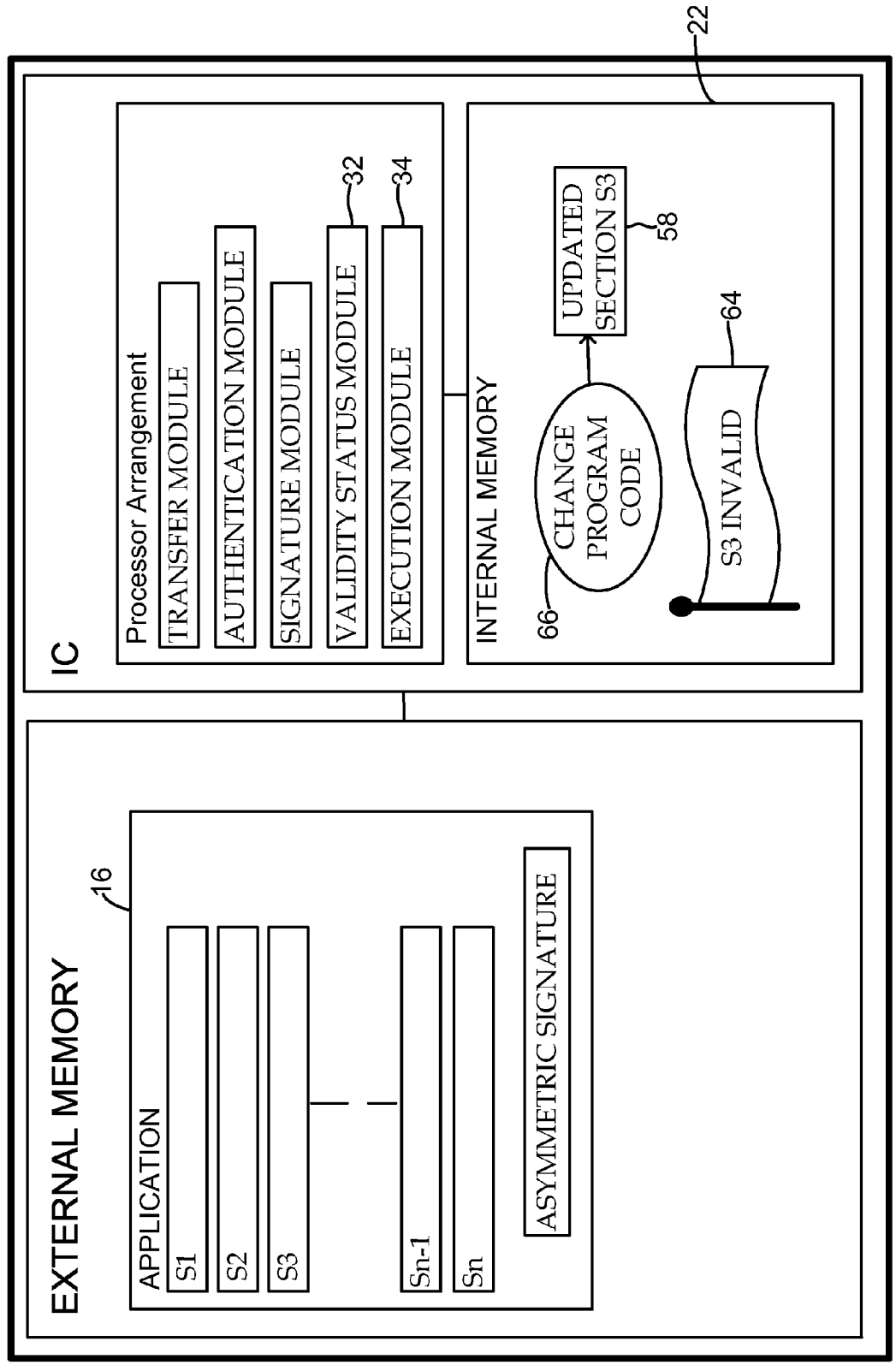
FIG. 6 is a block diagram view of the system of FIG. 1 invalidating the section of the application of FIG. 5 after the section is modified.

Reference is now made to FIG. 6, which is a block diagram view of the system 10 of FIG. 1 invalidating the section 58 of the application 16 of FIG. 5 after the section 58 is modified.

The selected section 58 has been modified while cached in the internal memory 22 (oval 66). The validity status module 58 is preferably operative to invalidate the section 58, if the content of the section 58 is changed while stored in the internal memory 22. The invalidating preferably includes removing the flag 60 of FIG. 5 and/or flagging the section 58 as invalid with a flag 64.

Once the section 58 is no longer valid, the execution module 34 will generally no longer execute/utilize the section 58.

It is appreciated that software components of the present invention may, if desired, be implemented in hardware, using conventional techniques, or implemented partially in hardware and partially in software. A hardware implementation may be particularly advantageous for security and/or performance acceleration reasons.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A system, comprising:
an external memory operative to store data therein, the data including a plurality of sections, the data including an executable computer program, at least part of the data being signed with a primary RSA asymmetric signature, the at least part of the data including at least some of the sections;
an internal memory operationally connected to the external memory;
a processor arrangement operationally connected to the internal memory, the processor arrangement includes a transfer module, an authentication module, and a signature module; and
an integrated circuit having disposed thereon the internal memory and the processor arrangement, the integrated circuit being operationally connected to the external memory, the external memory not being on the integrated circuit,
wherein during a preliminary procedure:
the transfer module is operative to transfer the sections from the external memory to the internal memory;
the signature module is operative to: create a symmetric signature for each of the sections based on a first secret; to encrypt the symmetric signature of the cached section using a second secret, yielding a result; to output the result of the encryption for each of the sections to the external memory; and to output the second secret to the external memory, only after the primary RSA asymmetric signature has been positively authenticated by the authentication module; and
the transfer module is operative to transfer the at least some sections from the external memory to the internal memory only once during the preliminary procedure, so that while a cached one of the sections is in the internal memory: the authentication module is operative to calculate a hash based on the content of the cached section; the authentication module is operative to update a value for use in authenticating the primary RSA asymmetric signature based on the hash of the cached section; and the signature module is operative to create the symmetric signature for the cached section; and
the authentication module is operative to authenticate the primary RSA asymmetric signature based on the value which has been updated based on the at least some sections and,
wherein, prior to utilizing a selected one of the sections of the data: the transfer module is operative to transfer the selected section from the external memory to the internal memory; and the authentication module is operative to authenticate the symmetric signature of the selected section using the first secret and,
wherein the processor arrangement includes: a validity status module to identify the selected section as valid if the symmetric signature of the selected section is authentic; and an execution module to utilize the selected section of the data only if the selected section is valid, the validity status module being operative to invalidate the selected section, if the content of the selected section is changed while stored in the internal memory.

2. A system, comprising:

an external memory operative to store data therein, the data including a plurality of sections, at least part of the data being signed with a primary signature, the at least part of the data including at least some of the sections; and an internal memory operationally connected to the external memory; and a processor arrangement operationally connected to the internal memory, the processor arrangement includes a transfer module, an authentication module, and a signature module, wherein during a preliminary procedure:

the transfer module is operative to transfer the sections from the external memory to the internal memory;

the authentication module is operative to authenticate the primary signature; and the signature module is operative to create a symmetric signature for each one of the sections while each said one of the sections is cached in the internal memory, respectively, and where each of the symmetric signatures is based on a first secret;

the signature module is operative to encrypt the symmetric signature of the cached section using a second secret, yielding a result; and the signature module is operative to output the result of the encryption for each of the sections to the external memory;

wherein the signature module is operative to output the second secret to the external memory, only after the primary signature has been positively authenticated by the authentication module; and wherein, prior to utilizing a selected one of the sections of the data:

the transfer module is operative to transfer the selected section from the external memory to the internal memory; and the authentication module is operative to authenticate the symmetric signature of the selected section using the first secret.

3. The system according to claim 2, wherein:

the transfer module is operative to transfer the at least some sections from the external memory to the internal memory only once during the preliminary procedure, so that the authentication module is operative to update a value for use in authenticating the primary signature based on a cached section, while said cached one of the sections is in the internal memory; and the authentication module is operative to authenticate the primary signature based on the value which has been updated based on the at least some sections.

4. The system according to claim 3, wherein the authentication module is operative to: calculate a hash based on the content of the cached section; and update the value based on the hash of the cached section.

5. The system according to claim 2, further comprising an integrated circuit having disposed thereon the internal memory and the processor arrangement, the integrated circuit being operationally connected to the external memory, the external memory not being on the integrated circuit.

6. The system according to claim 2, wherein the primary signature is an asymmetric signature.

7. The system according to claim 6, wherein the asymmetric signature is an RSA signature.

8. The system according to claim 2, wherein the data includes an executable computer program.

9. The system according to claim 2, wherein:

the processor arrangement includes:

a validity status module to identify the selected section as valid if the symmetric signature of the selected section is authentic; and an execution module to utilize the selected section of the data only if the selected section is valid; and the validity status module is operative to invalidate the selected section, if the content of the selected section is changed while stored in the internal memory.

10. A method, comprising:

performing, using physical computing machinery, a preliminary procedure including:

transferring a plurality of sections of data from an external memory to an internal memory;

authenticating a primary signature of the at least part of the data, the at least part of the data including at least some of the sections; and creating a symmetric signature for each of the sections based while each said one of the sections is cached in the internal memory, respectively, and where each of the symmetric signatures is based on a first secret;

encrypting the symmetric signature of the cached section using a second secret, yielding a result; and outputting the result of the encryption for each of the sections to the external memory;

outputting the second secret to the external memory, only after the primary signature has been positively authenticated; and performing, using physical computing machinery, an authentication procedure for a selected one of the sections of the data, prior to utilizing the selected section, the authentication procedure including:

transferring the selected section from the external memory to the internal memory; and authenticating the symmetric signature of the selected section using the first secret.

11. The method according to claim 10, further comprising:

identifying the selected section as valid if the symmetric signature of the selected section is authentic;

utilizing the selected section of the data only if the selected section is valid; and invalidating the selected section, if the content of the selected section is changed while stored in the internal memory.

* * * * *

UNITED STATES PATENT AND TRADEMARK OFFICE
CERTIFICATE OF CORRECTION

PATENT NO.        : 8,181,034 B2                                        Page 1 of 1
APPLICATION NO.   : 12/450214
DATED             : May 15, 2012
INVENTOR(S)       : Elbaum et al.

It is certified that error appears in the above-identified patent and that said Letters Patent is hereby corrected as shown below:

Delete "each of the sections based while each said one of the sections" and insert therefor --each one of the sections while each said one of the sections-- in column 10, lines 30-31 (ninth and tenth lines of claim 10).

Signed and Sealed this
Seventh Day of August, 2012

David J. Kappos
*Director of the United States Patent and Trademark Office*